United States Patent

[11] 3,572,845

| [72] | Inventor | Donald D. Johannesen |
| | | South Bend, Ind. |
| [21] | Appl. No. | 792,213 |
| [22] | Filed | Jan. 13, 1969 |
| [45] | Patented | Mar. 30, 1971 |
| [73] | Assignee | The Bendix Corporation |

[54] HYDRAULIC PRESSURE RATE-OF-CHANGE CONTROL
6 Claims, 4 Drawing Figs.

[52] U.S. Cl. ................................................. 303/6,
60/54.5, 137/498, 188/152, 303/84
[51] Int. Cl. ..................................................... B60t 8/26,
B60t 15/00
[50] Field of Search ........................................ 303/6, 6
(C), 84; 60/54.5, 54.5 (E); 137/497—9, 517,
513.3; 188/152, 152.11, 151, 151.11

[56] References Cited
UNITED STATES PATENTS

| 2,121,936 | 6/1938 | Thomas | 137/498 |
| 2,391,211 | 12/1945 | White | 137/513.3 |
| 2,615,675 | 10/1952 | Mellert | 137/498 |
| 2,767,734 | 10/1956 | Anderson | 137/498 |
| 3,122,162 | 2/1964 | Sands | 137/498 |
| 3,377,109 | 4/1968 | Scott | 188/151.11 |
| 3,431,028 | 3/1969 | Yoder | 188/152.11 |

*Primary Examiner*—Milton Buchler
*Assistant Examiner*—John J. McLaughlin
*Attorneys*—C. F. Arens and Plante and Arens, Hartz, Hix and Smith ABSTRACT: The subject invention relates to a hydraulic pressure rate-of-change control device, which is interposed between a brake assembly and a source of pressurizable hydraulic fluid for actuating the brake assembly, to protect against permanent damage to the brake assembly resulting from a sudden or panic pressurization of said hydraulic fluid.

PATENTED MAR 30 1971 3,572,845
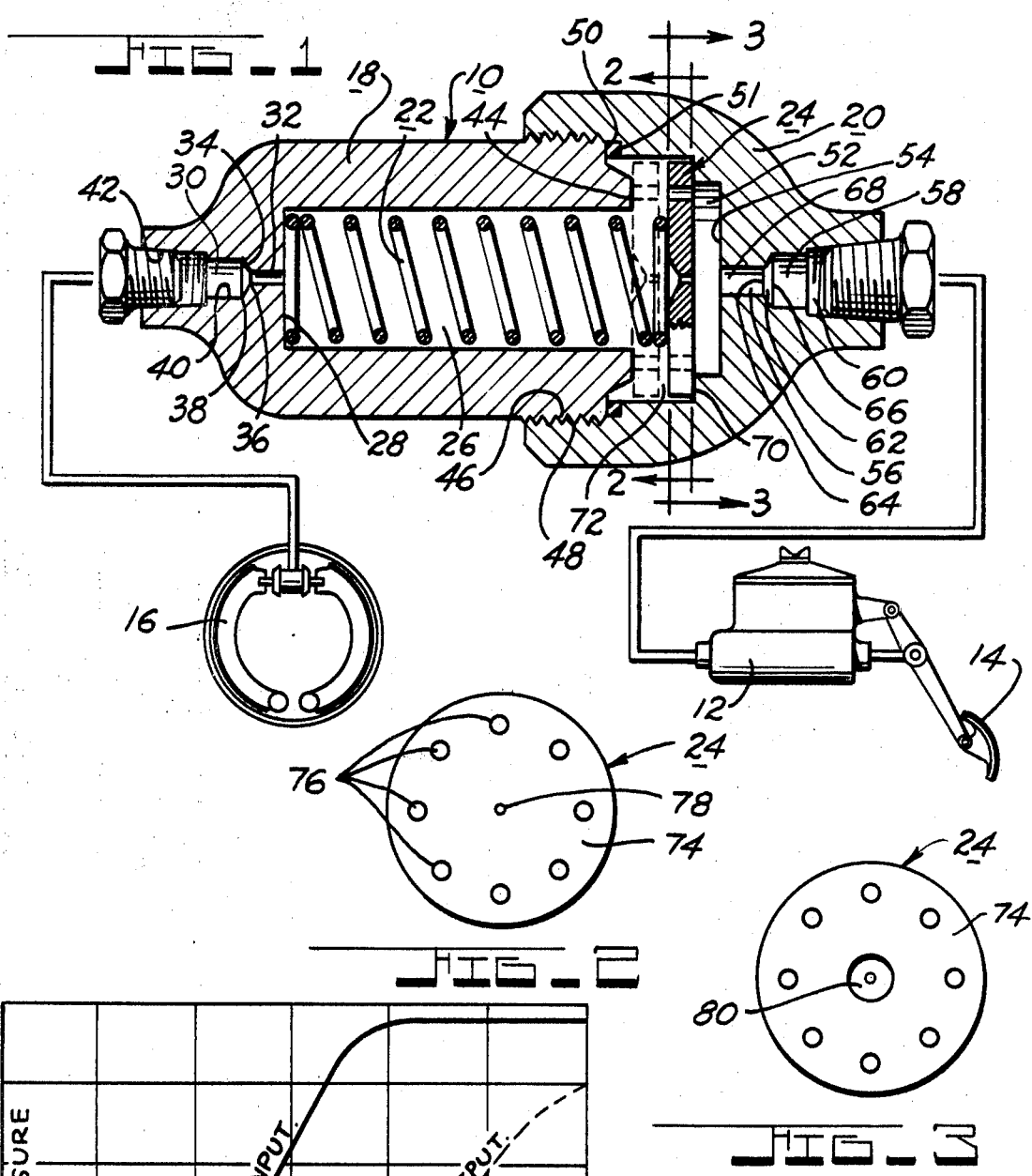
INVENTOR.
DONALD D. JOHANNESEN.
BY
Plante, Arens, Hartz, Hix & Smith
ATTORNEYS

HYDRAULIC PRESSURE RATE-OF-CHANGE CONTROL

BACKGROUND OF THE INVENTION

The braking systems with which I am familiar generally use a pressurized fluid for engaging braking members with the member to be braked to stop rotation thereof. In these systems, excessive hydraulic line pressure, imposed for example, by slamming down the brake pedal during a panic stop, locks the rotating mass of a wheel, tire and member to be braked in a very short time interval. Thus, since the torque loads imposed on the brake assembly are additive to the torques required to stop the vehicle being braked, permanent damage to the brake assembly frequently results.

This invention may well be most valuable in the braking art; however, it is felt that the invention may be used for any application where control of the rate-of-change of a hydraulic fluid is required.

SUMMARY OF THE INVENTION

It is an object of this invention to provide a hydraulic pressure rate-of-change control device which when interposed between the brake assembly and the source of pressurizable hydraulic fluid for actuating the brake assembly will prevent permanent damage to said brake assembly.

It is an object of this invention to provide a hydraulic pressure rate-of-change control device which when subjected to a sudden rapid pressurization of hydraulic fluid will respond to reduce the rate-of-change of the hydraulic pressure downstream from said device relative to the hydraulic pressure upstream from said device.

It is an object of this invention to provide a hydraulic pressure rate-of-change control device that will respond to normal hydraulic braking pressures in the conventional manner as if said control device were not interposed between the brake assembly and said source of hydraulic fluid.

It is an object of this invention to provide a hydraulic pressure rate-of-change control device that is simplified in construction to insure ease of manufacture and assembly while remaining low in cost.

Other objects and features of the invention will be apparent from the following description of the hydraulic pressure rate-of-change control device taken in connection with the accompanying drawings.

BRIEF DESCRIPTION OF THE DRAWINGS

FIG. 1 is a sectional schematic view of the hydraulic pressure rate-of-change control device;

FIG. 2 is a sectional view taken along line 2-2 of FIG. 1;

FIG. 3 is a sectional view taken along line 3-3 of FIG. 1; and

FIG. 4 is a graph showing hydraulic fluid pressure upstream and downstream from said control device, in response to a sudden and hard braking application, as a function of time.

DESCRIPTION OF THE PREFERRED EMBODIMENT

Referring now to the drawing, and particularly FIG. 1, therein is shown the hydraulic pressure rate-of-change control device generally referred to by numeral 10. The rate-of-change control device 10 is interposed in a vehicle hydraulic line being connected on one end to a source of pressurizable hydraulic fluid 12 which is responsive to a vehicle brake pedal 14, to pressurize said hydraulic fluid. The other end of the hydraulic line is operatively connected to a drum brake assembly 16 which is responsive to pressurization of the hydraulic fluid to brake the vehicle to a stop.

The hydraulic pressure rate-of-change control device 10 is comprised of a housing member 18, a cover member 20, a resilient means 22 and a valve or baffle means 24.

The housing member 18 includes a chamber 26 therein having an end 28 to which an outlet 30 is connected. The outlet 30 includes a first conduit 32, which is connected to receive fluid from chamber 26; a diverging frustroconical portion 34 having inner and outer diameters 36 and 38 with said inner diameter 36 being connected to said first conduit 32; and a second conduit 40 which is connected on one end to said outer diameter 38 and on its other end to said hydraulic line by means of a threaded portion 42. The chamber 26 has on its other end an annular sealing surface 44 extending radially therefrom for operable cooperation with the baffle means 24 which will be explained more fully hereinafter. The housing member 18 further has a threaded portion 46 for engagement with the cover member 20.

The cover member 20 is provided with an internally threaded portion 48 for cooperation with threaded portion 46 of said housing member 18 to insure a fluid-tight seal therebetween. An annular seal 50 may be interposed between said housing member 18 and annular portion 51 of said cover member 20 to further insure the integrity of the seal. The cover member 20 includes an inner chamber 52 having an end 54 to which an inlet 56 is connected. The inlet 56 includes a first conduit 58, which is connected to receive fluid from the hydraulic line which is connected to said cover member 20 by threaded portion 60; a converging frustroconical portion 62 having inner and outer diameters 64 and 66, with said outer diameter 66 being connected to said first conduit 58; and a second conduit 68 which is connected on one end to said inner diameter 64 and on its other end to pass fluid into said inner chamber 52. The inner chamber 52 further has on its other end an annular abutment surface 70 extending radially therefrom against which said baffle means 24 normally abuts. Cover member 20 also includes an outer chamber 72 which joins with the outermost periphery of said annular abutment surface 70 and extends axially away therefrom so as to form an intersection with the outermost periphery of said annular portion 51 of said cover member 20.

A resilient means or spring 22 is installed in chamber 26 and has one end abutting said end 28 while its other end engages one side of said baffle means 24 to bias or preload said means against said abutment surface 70. As may best be seen in FIGS. 2 and 3, the valve or baffle means 24 comprises an annular member 74 having a plurality of peripheral axial conduits 76 and a concentric axial conduit 78. The conduit 78 includes a diverging portion 80 to provide for a smoother flow of hydraulic fluid under pressure through said conduit 78.

MODE OF OPERATION OF THE PREFERRED EMBODIMENT

During normal operation of the vehicle embodying the above-mentioned hydraulic pressure rate-of-change control device 10, the source of hydraulic fluid 12 is not pressurized and the resilient means 22 has the baffle means 24 biased against the abutment surface 70 whereby hydraulic fluid is communicated between said chamber 52 and said chambers 72 and 26.

In response to an application of the brake pedal 14 by the operator of the vehicle, the hydraulic fluid is pressurized by the source 12. The finite time interval to pressurize the hydraulic fluid is, in part, a direct function of the speed and force exerted by the vehicle operator on the brake pedal 14. Thus, it has been found in the past by laboratory testing and inservice use, that slamming the brake pedal 14 to the floor during a panic stop, imposes excessively high hydraulic pressures on the brake actuator and brake assembly whereby permanent damage to the brake assembly 16 frequently results. Therefore, the present invention alters the rate-of-change of the hydraulic pressure applied to the brake assembly 16 relative to the output pressure of said source 12, to prevent this type of permanent brake assembly damage.

FIG. 4 then is a graph showing the hydraulic fluid pressure input to, and the hydraulic fluid pressure output from, the hydraulic pressure rate-of-change control device 10, plotted as a function of time. Input and output hydraulic fluid pressures are plotted along the ordinate as a function of time plotted along the abscissa. It is noted that the input curve of FIG. 4 is representative of a conventional vehicle braking system.

In response then to an emergency or panic stop by the operator of the vehicle the source 12 begins to pressurize the hydraulic fluid. As the fluid pressure rises, hydraulic fluid rushes into chamber 52 of control device 10. The hydraulic fluid tends to flow from chamber 52 through conduits 76 and 78; however, the hydraulic fluid pressure buildup into chamber 52 is so fast that the pressure moves the baffle means 24 axially to the left to engage the annular sealing surface 44 (as shown in FIG. 1 by the dotted outline) so as to seal the conduits 76 and prevent a further rapid hydraulic pressure buildup at the outlet 30 of said control device. Thus, a continuing pressure buildup of the pressure at the inlet 56 of the control device 10, can only be communicated gradually to the outlet 30 since the size of the concentric conduit 78 is predetermined to throttle the rate-of-change of the outlet 30 with respect to the inlet 56 immediately subsequent to a braking application. After a predetermined lapse of time, the pressure level of the hydraulic fluid at the inlet 56 will communicate through conduit 78 so that the fluid pressure in chamber 26 will approach that of the inlet 56, at which time the spring 22 will urge the baffle means 24 away from the annular sealing surface 44 and back into engagement with the annular abutment surface 70.

It is further mentioned that during normal braking applications, the rate of buildup of the inlet hydraulic pressure will not be fast enough to overcome the preload of the spring 22 against the baffle means 24. Thus, whatever hydraulic pressure is present at the inlet 56 will be communicated directly to the outlet 30 and ultimately to the brake assembly 16 without incurring damage to said brake assembly 16.

While the specific details have been herein shown and described, the invention is not confined thereto, as other substitutions can be made within the spirit and scope of the invention.

I claim:

1. A hydraulic pressure rate-of-change control device interposed in a series flow relationship with a pressurizable hydraulic line, said hydraulic pressure rate-of-change control device comprising:

a housing having an inlet, an outlet, and defining a stepped chamber therewithin presenting larger and smaller diameter portions with a shoulder therebetween;

a baffle member slidably disposed in said larger diameter portion of said chamber;

resilient means within said chamber for biasing said baffle means away from said shoulder;

said baffle member including a plurality of peripheral axial conduits and another conduit through the central portion of said member;

said baffle member having a plurality of peripheral axial conduits and another axial conduit extending through the central section of said baffle member;

said peripheral conduits being aligned with said shoulder whereby upon pressurization of said hydraulic lines the force due to fluid pressure acting upon said baffle member to drive the latter into engagement with said shoulder to close said peripheral conduits; and said another conduit remaining open after said baffle member engages said shoulder to permit limited flow of fluid through the baffle member in response to said pressurization of the brake lines.

2. A baffle means as recited in claim 1, wherein said concentric axial conduit includes a diverging portion.

3. A hydraulic pressure rate-of-change control device interposed in a series flow relationship with a pressurizable hydraulic line, said hydraulic pressure rate-of-change control device comprising:

a housing member including a chamber therein having on one end an outlet and on its other end a sealing surface extending radially therefrom;

a cover member operably connected to said housing member;

said cover member including an inner chamber having on one end an inlet and on its other end an abutment surface extending radially therefrom;

said cover member further including an outer chamber extending axially away from said abutment surface;

a baffle means, including axial conduits therethrough, slidably disposed in said outer chamber; and a resilient means interposed between said housing member and said baffle means to bias said baffle means into engagement with said abutment surface to maintain said axial conduits in a normally open position; and said baffle means responsive to pressurization of said hydraulic line to compress said resilient means so as to engage said sealing surface and partially close said axial conduits to reduce the rate-of-change of said outlet hydraulic pressure relative to said inlet hydraulic pressure.

4. A hydraulic pressure rate-of-change control device as recited in claim 3, wherein said outlet comprises:

a first conduit connected on one end to said chamber;

a diverging frustroconical portion having inner and outer diameters; said frustroconical portion having its inner diameter connected to the other end of said first conduit; and a second conduit connected on one end to said outer diameter of said frustroconical portion.

5. A hydraulic pressure rate-of-change control device as recited in claim 3, wherein said abutment surface is annular.

6. A hydraulic pressure rate-of-change control device as recited in claim 3, wherein said resilient means comprises a coil spring.